United States Patent
Flesch et al.

(10) Patent No.: US 11,953,228 B2
(45) Date of Patent: Apr. 9, 2024

(54) TABLE FAN AND METHOD FOR CLEANING A TABLE FAN

(71) Applicant: BSH Hausgeräte GmbH, Munich (DE)

(72) Inventors: Sebastien Flesch, Gerstheim (FR);
Jeremy Jellimann, Bischheim (FR);
Henri Klein, Riedisheim (FR)

(73) Assignee: BSH Hausgeräte GmbH, Munich (DE)

( * ) Notice: Subject to any disclaimer, the term of this patent is extended or adjusted under 35 U.S.C. 154(b) by 839 days.

(21) Appl. No.: 16/975,735

(22) PCT Filed: Feb. 18, 2019

(86) PCT No.: PCT/EP2019/053910
§ 371 (c)(1),
(2) Date: Aug. 26, 2020

(87) PCT Pub. No.: WO2019/166249
PCT Pub. Date: Sep. 6, 2019

(65) Prior Publication Data
US 2020/0408441 A1   Dec. 31, 2020

(30) Foreign Application Priority Data

Feb. 27, 2018 (EP) .................... 18290015

(51) Int. Cl.
*F24F 13/28* (2006.01)
*B01D 46/00* (2022.01)
*F24C 15/20* (2006.01)

(52) U.S. Cl.
CPC .......... *F24F 13/28* (2013.01); *B01D 46/0002* (2013.01); *F24C 15/2035* (2013.01); *F24C 15/2057* (2013.01)

(58) Field of Classification Search
CPC .... F24F 13/28; F24F 15/2035; F24F 15/2057; B01D 46/0023; B01D 46/0002
See application file for complete search history.

(56) References Cited

U.S. PATENT DOCUMENTS 6,698,419 B2    3/2004  Lee
7,687,748 B2 *  3/2010  Gagas ................. F24C 15/2042
                                                    219/623

FOREIGN PATENT DOCUMENTS

| CN | 115897091 A * | 4/2023 | |
| DE | 19912913 A1 | 9/2000 | |
| DE | 202013005303 U1 | 6/2013 | |
| EP | 3473937 A1 | 4/2019 | |
| FR | 2631534 A3 | 11/1989 | |
| JP | 2007003088 A | 1/2007 | |
| WO | WO-2004016988 A1 * | 2/2004 | ......... B01D 46/0023 |

OTHER PUBLICATIONS

International Search Report PCT/EP2019/053910 dated Apr. 29, 2019.

* cited by examiner

*Primary Examiner* — Robert A Hopkins
(74) *Attorney, Agent, or Firm* — Michael E. Tschupp; Andre Pallapies; Brandon G. Braun

(57) ABSTRACT

A table fan includes a fan generating a flow of air, a cleaning device including a circulation system for guiding cleaning liquid in a cleaning circuit, a filter chamber having a suction opening via which air is suctioned downwards, and a filter element arranged in the filter chamber and having at least one portion which is located in the cleaning circuit.

19 Claims, 5 Drawing Sheets

TABLE FAN AND METHOD FOR CLEANING A TABLE FAN

CROSS-REFERENCES TO RELATED APPLICATIONS

This application is the U.S. National Stage of International Application No. PCT/EP2019/053910, filed Feb. 18, 2019, which designated the United States and has been published as International Publication No. WO 2019/166249 A1 and which claims the priority of European Patent Application, Serial No. 18290015.9, filed Feb. 27, 2018, pursuant to 35 U.S.C. 119(a)-(d).

BACKGROUND OF THE INVENTION

The present invention relates to a table fan and a method for cleaning a table fan.

During cooking processes on a cooking hob, vapors and fumes arise. Extraction devices are known by means of which vapors and fumes can be extracted and cleaned. In particular, extractor hoods which are mounted above the cooking hob are known. In addition, table fans in which air from the cooking hob is extracted downwards are known. Table fans can also be referred to as hob fans or table hoods and can be integrated into the cooking hob or placed adjacent to the cooking hob, for example in a worktop.

When operating a table fan, impurities are deposited on filter elements which are provided to filter out impurities in the table fan. Impurities are also deposited on housings in the table fan through which the vapors and fumes flow during the operation of the table fan. In the case of customary table fans, the filter elements must be removed and, if need be, cleaned in a dishwasher. Parts of the table fan which cannot be removed must be cleaned manually.

A disadvantage of such known table fans is therefore that they are complicated to clean.

In addition, in the case of extractor hoods which are arranged above a cooking hob, the provision of a spraying device for cleaning water in the extractor hood is known, by means of which part of the extractor hood is cleaned. Such a spraying device is, for example, described in DE 199 12 913 A1. The interior of the extractor hood is sprayed with cleaning water at intervals by means of a spraying device and this cleaning water is removed from a collection sump at the bottom of the interior of the extractor hood via a pipe.

A disadvantage of this cleaning device is that the water consumption is high, and cleaning can only take place in one mode, with the result that reliable cleaning is not ensured.

BRIEF SUMMARY OF THE INVENTION

The object of the invention is therefore to create a solution by means of which a table fan can be reliably cleaned in a simple manner.

According to a first aspect, the object is achieved by a table fan comprising a fan and a suction opening via which air is suctioned downwards, and a filter chamber having at least one filter element. The table fan is characterized in that the table fan comprises a cleaning device which has a circulation system for guiding cleaning liquid in a cleaning circuit, and at least one portion of the filter element is located in the cleaning circuit.

According to the invention, the table fan comprises a fan and a suction opening via which air is suctioned downwards. The suction opening can be located horizontally or inclined to the horizontal, for example vertically. In addition, the table fan has a filter chamber having at least one filter element. A housing on which the suction opening is provided is referred to as a filter chamber here. The filter element can be located in the suction opening or be arranged in the direction of flow after the suction opening in the filter chamber.

The table fan is characterized in that it comprises a cleaning device having a circulation system for guiding cleaning liquid in a cleaning circuit and at least one portion of the at least one filter element is located in the cleaning circuit. The circulation system can consist of different components. In particular, the circulation system can have pipes, hoses and/or containers as components. In addition, pumps and valves can be provided in the circulation system. In addition to the circulation system, the cleaning device can have covers or dampers by means of which the circulation system is closed during cleaning. The cleaning liquid can, for example, constitute water. The circulation system serves to guide the cleaning agent in a cleaning circuit. The course of the cleaning liquid is referred to as a cleaning circuit in which the cleaning liquid runs through the components of the circulation system at least once. In particular, the cleaning liquid is again guided to a component of the circulation system from which the cleaning liquid was originally introduced into the cleaning circuit. According to the invention, at least one portion of the at least one filter element is located in the cleaning circuit. This means that in each cycle the cleaning liquid passes at least one portion of the filter element. In addition, the cleaning liquid preferably passes at least one portion of the walls of the filter chamber.

According to the invention, by providing a circulation system via which a cleaning liquid can be guided in a cleaning circuit and at least one portion of the at least one filter element is located in the cleaning circuit, a series of advantages can be achieved. In particular, different cleaning cycles can be run. Thus, in a first cleaning cycle, for example, the cleaning liquid can have a different temperature or different composition than in another cleaning cycle. The composition of the cleaning liquid in one cleaning cycle may, for example, consist solely of water and in another cleaning cycle of water with a cleaning agent. By guiding the cleaning liquid in a cleaning circuit, the amount of cleaning liquid is also limited as it can be used multiple times for cleaning at least one portion of the filter element. In addition, the cleaning liquid can also be evaporated in a cleaning cycle, for example, and be present as steam at least in the portion of the cleaning circuit in which the filter element is located. Through the provision of a circulation system, at least one portion of the filter element can therefore be cleaned as in a dishwasher and be subject to different cleaning cycles in the process. During the cleaning cycle, the cleaning circuit preferably constitutes a closed circuit.

According to an embodiment, the circulation system of the cleaning device has a reservoir for the cleaning liquid, at least one nozzle at least temporarily directed at the at least one filter element, at least one pump for pumping the cleaning liquid to the at least one nozzle and at least one connecting line between the reservoir and the at least one nozzle for supplying cleaning liquid to the nozzle.

In this embodiment, the circulation system is therefore essentially formed by the reservoir, the connecting line to the nozzles and the filter chamber in or on which the filter element or filter elements are provided.

The reservoir is preferably connected via the at least one connecting line to the at least one nozzle for supplying cleaning liquid. The connecting line may consist of one or more pipes and/or hoses. One or more nozzles can be provided in the cleaning device. If a plurality of nozzles is provided, these can, for example, be provided on a common pipe. However, it is also within the scope of the invention to provide each nozzle with its own pipe through which cleaning liquid is supplied to the nozzle. The nozzle or nozzles are at least temporarily directed at the filter element or the filter elements. This means that the cleaning liquid is output at least in the direction of the filter element. In addition, however, the cleaning liquid output from the nozzle or nozzles can also be directed at least at a portion of the walls of the filter chamber. The nozzles can be installed in the table fan in a fixed or moveable manner, in particular pivoted or movably mounted. According to the preferred embodiment, the cleaning device comprises at least one pump through which the cleaning liquid is pumped to the at least one nozzle. The pump can be arranged in the reservoir or in the connecting line. The cleaning liquid is moved in the cleaning circuit by means of the pump.

This embodiment of the cleaning device, in which the circulation system has a reservoir, at least one nozzle, at least one pump and at least one connecting line between the reservoir and the at least one nozzle, has the advantage that the at least one filter element can be cleaned by means of the nozzles and the cleaning liquid used for this purpose can be returned to the cleaning circuit again in a simple manner. For cleaning in this embodiment, the position of the filter element need not be moved out of the position in which it is located when the table fan is in an operating state or an idle state. In particular, the user does not need to remove the filter element from the table fan to clean the same. Rather, the filter element can be automatically cleaned.

The reservoir for the cleaning liquid may constitute a portion of the filter chamber or be a container separate from the filter chamber. Preferably, the reservoir is positioned in such a way that at least in some areas it is beneath the filter element for receiving cleaning liquid from the filter element. Hereby, the cleaning liquid can get from the filter element to the reservoir by means of gravity. In the simplest case, the cleaning liquid can drip from the filter element into the reservoir. However, it is also within the scope of the invention that the liquid is guided from the filter element via a line between the filter chamber and the reservoir. In this case too, with a reservoir which is beneath the filter element, in other words which is lower than the filter element, gravity can be used to guide the cleaning liquid to the reservoir.

In the embodiment in which the reservoir forms a part of the filter chamber, it preferably constitutes the lower area of the filter chamber. Particularly preferably, in the lower area the filter chamber in this embodiment has a shape which permits the complete drainage of cleaning liquid from the reservoir. In particular, the emptying of the reservoir at the end of the cleaning process but also the full return of the cleaning liquid from the reservoir to the nozzle or nozzles should be enabled thereby. In particular, the bottom of the filter chamber can be inclined for this purpose, at least in some areas. The connecting line is preferably arranged in the lower area of the reservoir and in particular, on the bottom of the reservoir.

The cleaning liquid can be used in the cleaning circuit at room temperature or at the temperature of the same in a supply pipe. However, according to the invention it is also possible to heat the cleaning liquid in the cleaning circuit at least temporarily.

Preferably, at least one heating element is provided in the cleaning device for this purpose. Particularly preferably, the heating element is provided in the circulation system. The heating element or heating elements can be provided in the reservoir or in the connecting line. Hereby it is possible to heat the cleaning liquid, for example, for one or more cleaning cycles and to increase its cleaning efficiency as a result. The provision of at least one heating element is particularly advantageous for the table fan according to the invention as the necessary heat output is minimized on account of guiding the cleaning liquid in a cleaning circuit.

If the heating element is arranged in the reservoir, it can, for example, be provided at the bottom of the reservoir.

In addition to a heating element or as an alternative, an evaporator can be provided in the circulation system, in which the cleaning liquid is evaporated. The evaporator is arranged such that the evaporated cleaning liquid is emitted as steam by the nozzles at least onto the filter element. In this embodiment, the steam condenses on the filter element and thus reaches the reservoir in a liquid state as a cleaning liquid again.

According to a preferred embodiment, the cleaning device has at least one supply connection for supplying cleaning liquid to the cleaning circuit and at least one outlet connection for draining cleaning liquid from the cleaning circuit. The supply connection can constitute an opening in the filter chamber to which a supply pipe can be connected. Alternatively, the supply connection can be provided on the connecting line of the circulation system and, for example, constitute a branch to which a supply pipe can be connected. The supply pipe can, for example, be a water pipe of a house, which as a rule is laid in kitchens. Hereby it is possible during the cleaning process, for example between cleaning cycles or during a cleaning cycle, to put cleaning liquid, for example fresh water, into the cleaning circuit.

Particularly preferably, the supply connection is arranged on the filter chamber and is positioned in such a way that it is at a distance from the reservoir. If the reservoir is formed by the lower area of the filter chamber, the supply connection is at a distance from the maximum fill level of cleaning liquid in the reservoir. This enables prevention of the inadvertent entry of cleaning liquid into the supply pipe.

The cleaning device preferably has at least one outlet connection for draining cleaning liquid from the cleaning circuit. The outlet connection can be provided on the reservoir or in the connecting line. An outlet which, for example, leads to a wastewater pipe of the house, which as a rule is laid in kitchens, can be connected to the outlet connection. The cleaning liquid can be removed from the cleaning circuit partially or in full via the wastewater pipe. In particular, the cleaning liquid can be discharged via the wastewater pipe between cleaning cycles or after the entire cleaning process.

By means of the supply connection and the outlet connection the cleaning device and in particular the circulation system can be connected to the water system of a kitchen in a simple manner.

The suction opening of the table fan may constitute the upper edge of a box-shaped filter chamber. Alternatively, the suction opening may also be located on one side of a portion of the filter chamber.

According to an embodiment, the filter chamber consists of two housing parts and the suction opening is formed in a housing part which is extendable upwards at least in some areas. This embodiment is an extendable table fan. The suction opening can be provided, for example, in a side wall of the housing part which is extendable. The further housing part is preferably firmly retained in the table fan. The extension of the housing part on which the suction opening is provided can take place by way of an extension mechanism which is mounted, for example, on or in the fixed housing part. The extension mechanism can, for example, constitute a spindle. The suction opening is preferably provided on the filter chamber and in particular the movable housing part, such that the flow can only pass through the same when the housing part is extended or partially extended. In the extended position, which can also be referred to as the operating position, the suction opening is above the fixed housing part. The filter element is preferably arranged in the suction opening. In the retracted position of the movable housing part, the filter element is preferably accommodated in the fixed housing part. Thus, the suction opening and the filter element, which is preferably arranged on the suction opening, are also in the retracted position inside the fixed housing part. Thus, the filter element can be cleaned there.

The embodiment in which the housing part on which the suction opening is provided can be extended has a number of advantages. On the one hand, the nozzle or nozzles can be arranged in the fixed housing part and only located in the direction of flow in front of the filter element when the movable housing part is retracted. When extended, in other words in the operational state, on the other hand, the nozzles can thus be located in the direction of flow behind the filter element and thus be protected from impurities. In addition, the filter chamber can be closed automatically in the retracted position by means of the movable housing part. For example, a wall of the open-bottomed movable housing part can conceal the inlet of a suction pipe coming off the filter chamber. In addition, when retracted the upper side of the movable housing part can close the lower housing part of the filter chamber and thus the entire filter chamber at the top. Finally, in this embodiment with two housing parts, an intermediate position of the movable housing part can be set in which the same is only partially extended upwards. As a result, operation of the fan can enable a certain airflow in the filter chamber by means of which the filter element can be dried after cleaning. During operation, air can also be extracted from a greater height above the cooking hob, for example from saucepans, using the extendable table fan.

According to an embodiment, the table fan has a cover which at least temporarily closes the filter chamber at the top. In the embodiment, in which the filter chamber consists of two housing parts, the cover can be provided on the upper side of the extendable housing part. In an embodiment in which the filter chamber is fixed, the cover can be provided as a damper which can be pivoted at the top of the filter chamber or be designed to be removable from the filter chamber.

The cleaning circuit can be closed by temporarily closing the filter chamber at the top. The escape of cleaning liquid during the cleaning process is prevented by this means. In addition, in the case of a cover which seals the filter chamber, it is possible to evaporate the cleaning liquid in a portion of the cleaning circuit, for example by means of a sealing lip. In particular, the cleaning liquid can be evaporated before the nozzle or nozzles, and the filter chamber and in particular the filter element or filter elements can be cleaned with steam in this way.

In addition, the table fan preferably has a damper which closes the filter chamber with regard to a suction pipe. On the filter chamber a suction pipe is provided which is connected to the fan of the table fan. For the cleaning of the table fan, this suction pipe must be closed to prevent the introduction of cleaning liquid into the suction pipe and consequently the fan. The suction pipe can be closed by a damper which is realized at the inlet of the suction pipe and is mounted in a pivotable or movable manner. In the embodiment, in which the filter chamber comprises two housing parts, this damper can be replaced by a wall of the movable housing part.

According to a preferred embodiment, the table fan has at least one control unit for automatic cleaning of the at least one filter element by the cleaning device. The control device in particular serves to add a cleaning liquid to the cleaning circuit and to move the cleaning liquid in the cleaning circuit. In particular, the pump, and where provided, valves for supplying and draining the cleaning liquid, and—if provided—a heating element and/or evaporator can be activated by the control unit. In addition, the filter chamber can be automatically closed by the control system before cleaning is commenced. For example, the movable housing part can be retracted or a cover on the upper side and a damper on the suction pipe can be moved to close the filter chamber.

According to another aspect, the invention relates to a method for cleaning a table fan according to the invention. The method is characterized in that it comprises the following steps pumping the cleaning liquid to at least one nozzle and spraying the at least one filter element with cleaning liquid, collecting the cleaning liquid by the filter element, and further pumping the cleaning liquid pumped to the at least one nozzle.

Advantages and features described with regard to the table fan according to the invention also hold true—insofar as applicable—for the method according to the invention and vice versa.

In a first step, cleaning liquid is preferably supplied to the cleaning circuit. This can take place, for example, via a supply pipe which is connected to the water pipe of the kitchen. Preferably, water is supplied until the reservoir has been completely filled or is filled to a desired fill level. In a next step, the cleaning liquid is pumped from the reservoir to the nozzles which are provided in or on the filter chamber. This preferably takes place via the connecting line so that the cleaning liquid is pumped to the nozzles. Via the nozzles, the cleaning liquid is sprayed into the filter chamber and preferably onto the filter element or filter elements. The cleaning liquid is again collected in the reservoir from the walls of the filter chamber or from the filter element or filter elements. The steps of pumping and collection are then repeated.

Hereby, the cleaning liquid passes through the filter chamber several times and the filter chamber and in particular the filter elements provided therein or thereon can be reliably cleaned.

According to an embodiment of the method, the method comprises the step of removing the cleaning liquid from the cleaning circuit after going through the steps of pumping and collection at least once, followed by a step of adding further cleaning liquid to the cleaning circuit and by going through pumping and collection at least once more.

In this embodiment, the cleaning liquid can be discharged and replaced with fresh cleaning liquid between cleaning cycles, thus ensuring reliable cleaning of the table fan. At the end of the cleaning process, the cleaning liquid is completely removed from the cleaning circuit and the circulation system preferably drained.

According to a preferred embodiment, the method comprises the step of adding a cleaning agent to the cleaning circuit. The cleaning agent is preferably added to the cleaning liquid in the reservoir. The cleaning agent can be a liquid or solid cleaning agent. The cleaning agent can preferably comprise a plurality of components which differ according to their properties. This cleaning agent is referred to as a multi-component cleaning agent. In particular, one component may dissolve more quickly in the cleaning liquid than another component. Alternatively, or in addition, a component may dissolve or become active only at increased temperatures, for example, while another component already dissolves or becomes active at lower temperatures.

By adding a cleaning agent, the cleaning effect is further enhanced. As the cleaning liquid is guided in a cleaning circuit in the method according to the invention, the requirement for cleaning agent is minimized. In addition, a multi-component cleaning agent can be used as different conditions can be set in the cleaning circuit.

According to an embodiment, the method comprises the step of heating the cleaning liquid. On the one hand, improved cleaning can be ensured by this means. In addition, for example, a cleaning agent with different components which dissolve at different temperatures or become active at different temperatures can be used.

According to a preferred embodiment, the method comprises the step of drying the circulation system by drying at least the filter chamber and in particular at least the filter element. The drying step may initially comprise the discharge or removal of the cleaning liquid from the cleaning circuit. Then, for example, the ventilation device of the table fan can be operated, whereby air is guided through the at least one filter element and the latter is dried.

According to a preferred embodiment, the method is automatically executed according to a program stored in a control unit.

Different programs can be stored here which can be selected by the user of the table fan individually or jointly. Thus, for example, a fast cleaning program can be stored. In this program, the cleaning device can, for example, be operated with water as a cleaning liquid and the water can be heated in the cleaning device or hot water can be added to the cleaning circuit.

Another program is a steam treatment. This can, for example, be selected to facilitate subsequent manual cleaning. Here, cleaning liquid is fed into the cleaning circuit and evaporated there.

Furthermore, programs for normal or intensive cleaning can be programmed. Water which is heated in the cleaning circuit in at least one cleaning cycle can be used as a cleaning liquid here. In addition, cleaning agents can be added in this program. The addition can take place manually.

Another program can be drying. First the cleaning liquid can be removed from the cleaning circuit and then the ventilation device operated to dry the filter element by means of the airflow.

In addition, a descaling program can be provided. In this program, a special cleaning agent can be added.

BRIEF DESCRIPTION OF THE DRAWINGS

The present invention is explained again in more detail hereinafter with reference to the accompanying figures. The figures show.

DETAILED DESCRIPTION OF EXEMPLARY EMBODIMENTS OF THE PRESENT INVENTION

Figure 1:
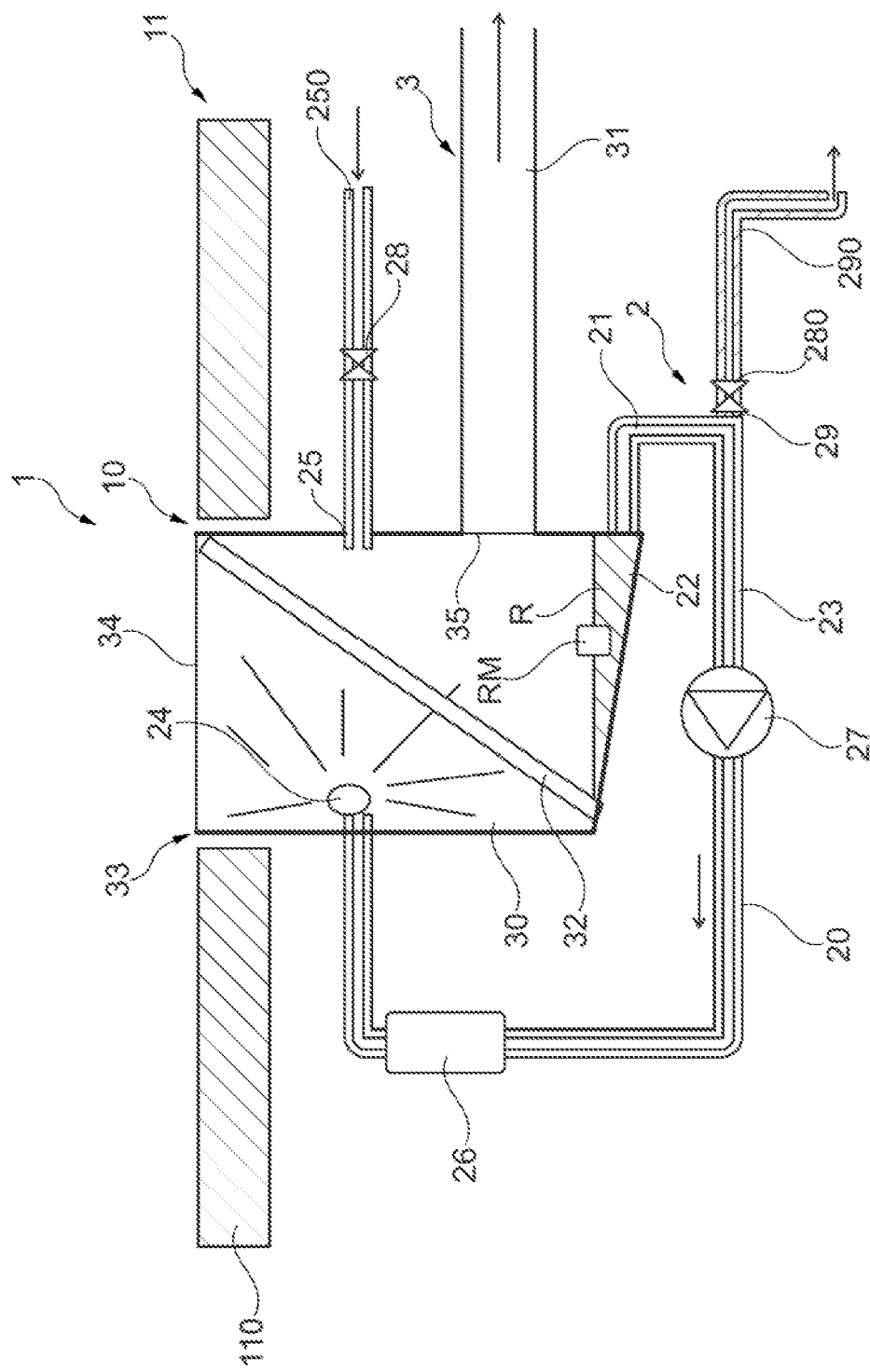
FIG. 1: A diagrammatic view of a first embodiment of the table fan according to the invention.

FIG. 1 shows a diagrammatic view of a first embodiment of the table fan 10 according to the invention. In the embodiment shown, the table fan 10 is part of a combination device 1 also comprising a cooking hob 11, of which only two cooking zones 110 are shown in FIG. 1. The table fan 10 is integrated into the cooking hob 11.

The table fan 10 comprises a ventilation device 3 and a cleaning device 2. The ventilation device 3 and its function are described in more detail with reference to FIG. 2, in which the table fan 10 is shown without a cleaning device for greater clarity. The ventilation device 3 has a filter chamber 30 which can also be referred to as a housing. The filter chamber 30 is arranged between the cooking zones 110 of the cooking hob 11. In the embodiment shown, the filter chamber 30 is a box-shaped housing open at the top. The suction opening 33 of the ventilation device 3 constitutes the opening of the filter chamber 30 on its upper side. At least one filter element 32 is arranged in the filter chamber 30. Only one filter element 32 is shown in the embodiment according to FIG. 2. The filter element 32 is inclined in the filter chamber 30. A suction pipe 31 which is connected to a fan (not shown) is attached to a side wall on the filter chamber 30. The filter element 32 is arranged in such a manner that it completely covers the inlet of the suction pipe 31 in a vertical projection onto the inlet.

A vacuum is created by the fan (not shown) during operation of the ventilation device 3. Air is sucked in through the suction pipe 31 because of this vacuum. As the suction pipe 31 is connected to the filter chamber 30, air is thereby sucked into the filter chamber 30 via the suction opening 33. The air entering the filter chamber 30, which as a rule is contaminated by water or fat particles and is also referred to as vapor, is shown diagrammatically by means of arrows in FIG. 2. As the filter element 32 is of such a size and orientation that it covers the inlet of the suction pipe 31, the air entering through the suction opening 33 must pass through the filter element 32 before it reaches the inlet of the suction pipe 31 and is extracted via the latter. Here, the air on the filter element 32 is freed from impurities that accumulate on the filter element 32.

Figure 2:
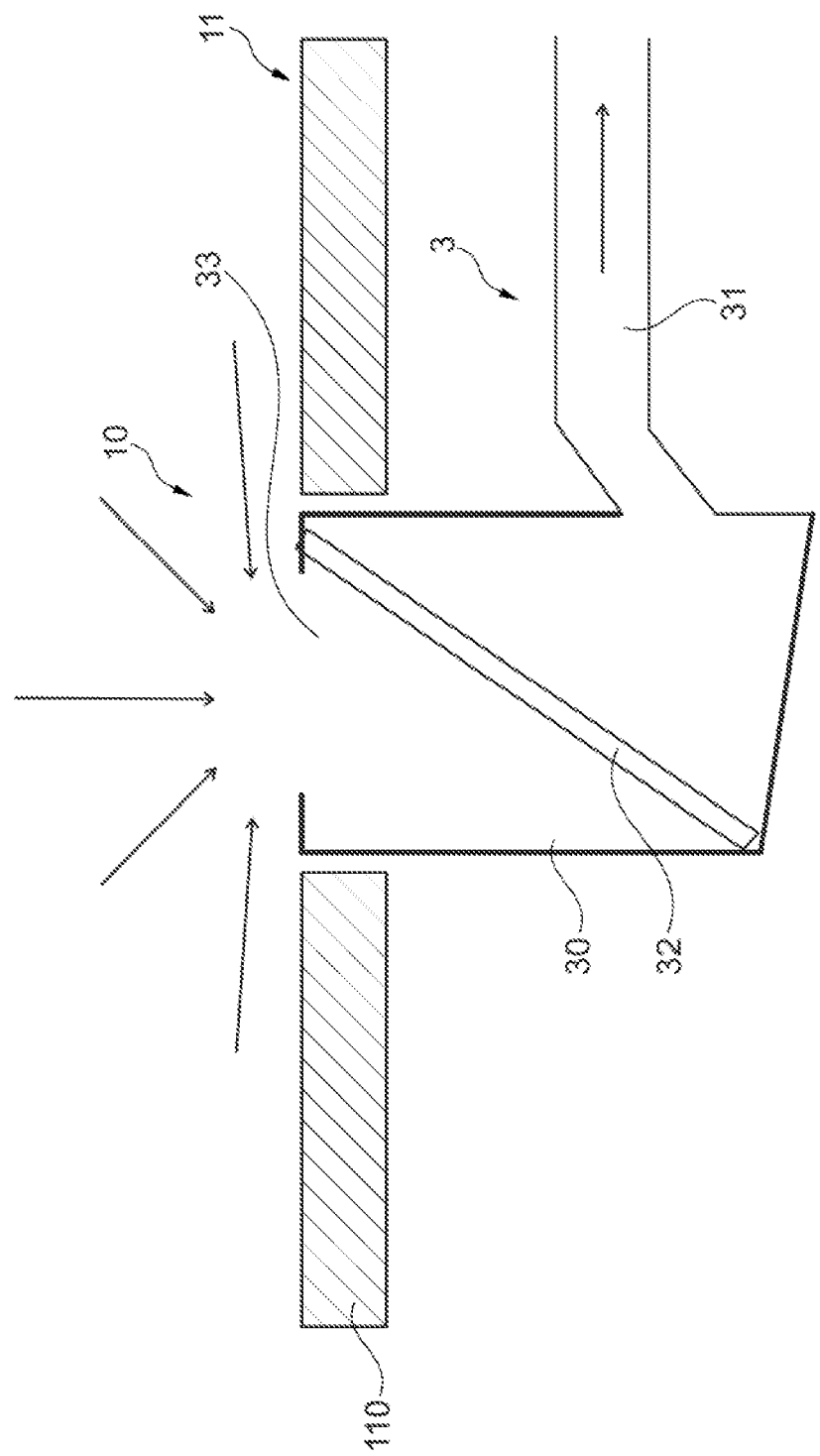
FIG. 2: A diagrammatic view of the method of operation of the ventilation device of the first embodiment of the table fan.

Apart from the ventilation device 3 described and shown in FIG. 2, the table fan 2 according to the invention also has a cleaning device 2. Moreover, a cover 34 is also provided on the ventilation device 3 in addition. The cover 34 temporarily covers the suction opening 34, in other words closes the filter chamber 30 at the top. A damper 35 is arranged on the inlet of the suction pipe 31 and closes the latter temporarily.

The cleaning device 2 comprises a circulation system 20. In the embodiment shown, the circulation system 20 comprises the filter chamber 30, a reservoir 22, a connecting line 23 and a nozzle 24 as components in which a cleaning liquid is guided in a cleaning circuit 21. Moreover, the circulation system 20 comprises a pump 27 and a heating element 26. In the embodiment shown, the pump 27 and the heating element 26 are located in the connecting line 23. In addition to the circulation system 20, the cleaning device 2 comprises a supply pipe 250 and a drain 290. A valve 28, 280 is provided in the supply pipe 250 and the drain 290 respectively. However, it is also within the scope of the invention that the valves 28, 280 are in each case not arranged in the supply pipe 250 and the drain 290 but, for example, at the end of the supply pipe 250 or a branch in the drain 290. There is an opening in one wall of the filter chamber 30 which serves as a supply connection 25 and via which the supply pipe 250 can be connected to the filter chamber 30. In the embodiment shown, a branch is provided in the connecting line 23 which serves as an outlet connection 29 to which the drain 290 is connected.

In the embodiment shown, the filter chamber 30 has a shape in which the bottom of the filter chamber 30 is inclined to one side. The connecting line 23 is connected to the filter chamber 30 in such a manner that it is located in the region of the filter chamber 30 at which it has a greater height, that is to say in the lower region of the inclined bottom.

The lower region of the filter chamber 30 forms the reservoir 22 of the circulation system 20. However, it is also within the scope of the invention that the reservoir is a separate component from the filter chamber 30 which is located beneath the filter chamber 30 and is connected to the filter chamber 30 for the conducting of cleaning liquid into the reservoir, for example via another line (not shown).

In the schematic diagram of FIG. 1, the connecting line 23 is arranged in the lower end of the side wall of the filter chamber 30. However, the connecting line can also be provided at another location, for example in the bottom of the filter chamber 30.

The supply pipe 250 is arranged in the upper region of the side wall of the filter chamber 30, that is to say opens into this filter chamber 30 in the upper region. The supply pipe 250 can also open into the filter chamber 30 at another location. It is only essential that the supply pipe 250 is arranged in such a manner that it does not come into contact with cleaning liquid R which accumulates in the reservoir 22. This prevents the cleaning liquid R from entering the water circulation system of the household.

After use, the ventilation device 3 of the table fan 10 can be automatically cleaned using the cleaning device 2 according to the invention.

The valve 28 in the supply pipe 250 can be opened for this purpose, whereby cleaning liquid R, in particular water, is conducted into the filter chamber 30. The amount of cleaning liquid R is preferably set via a control system (not shown). The amount is measured in such a way that sufficient cleaning liquid R is present in the cleaning circuit 21 to fill the reservoir 22 and the connecting line 23.

Cleaning liquid R is pumped from the reservoir 22 into the connecting line 23 via the pump 27. The cleaning liquid R can be heated via the heating element 26 and if necessary also evaporated. The cleaning liquid R is then output through the nozzle 24. The nozzle 24 is directed at least at the filter element 32 in the process. The cleaning liquid R, which runs downwards in or on the filter element 32 or drips from the latter, reaches the reservoir 22 again. During this cleaning process, both the cover 34 and the damper 35 are positioned in such a manner that they close the suction opening 33 or the inlet of the suction pipe 31. This cleaning process can be carried out until the filter element 32 is freed of impurities.

FIG. 1 shows diagrammatically in the cleaning liquid R a cleaning agent RM in the form of a tab. This can be introduced into the cleaning liquid R before or during the cleaning process.

The other cleaning programs mentioned above can also be carried out using the table fan 10 according to FIG. 1.

Figure 3:
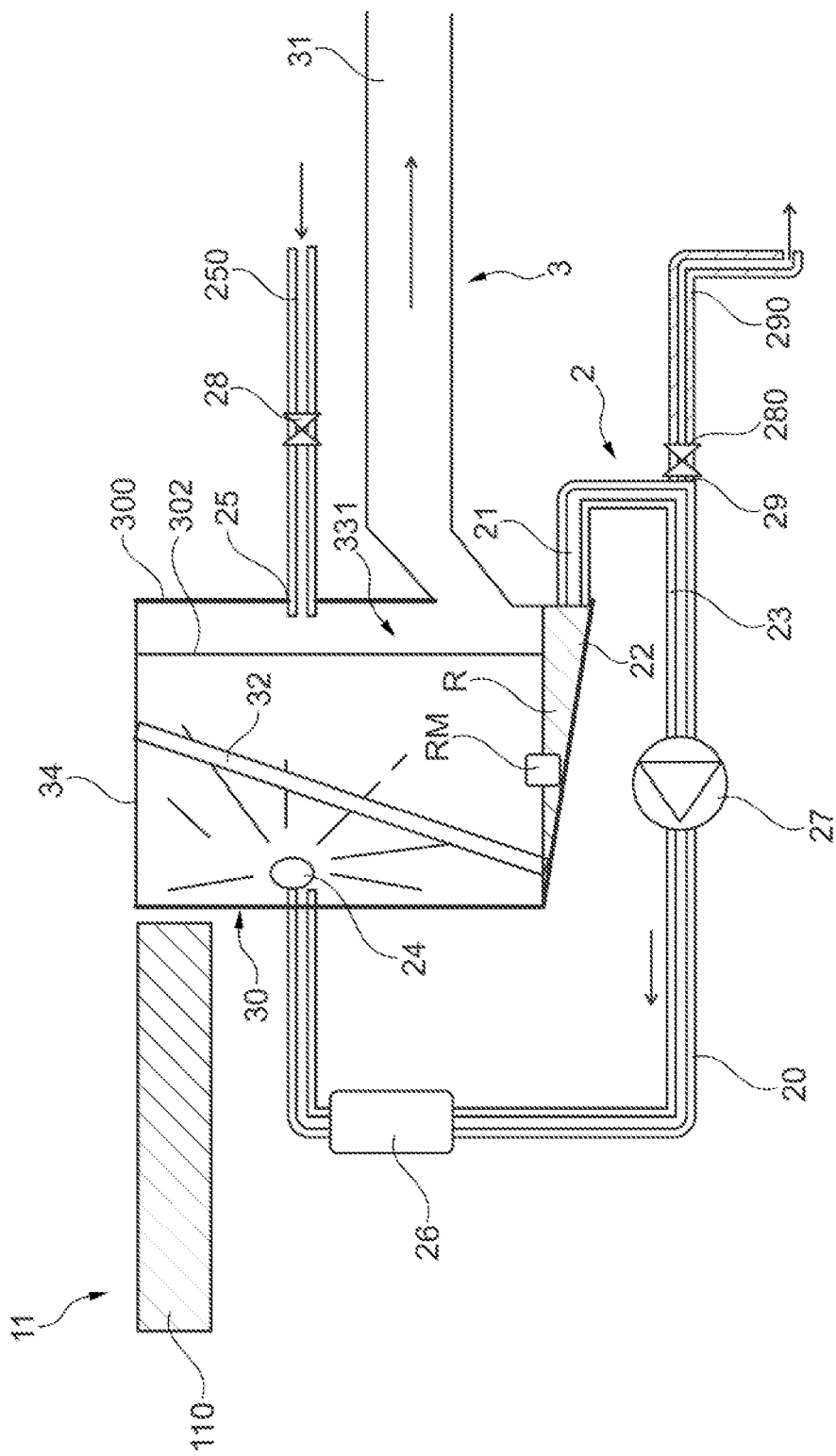
FIG. 3: A diagrammatic view of a second embodiment of the table fan according to the invention.

FIG. 3 shows another embodiment of a table fan according to the invention 10. This embodiment is a so-called downdraft table fan. The embodiment according to FIG. 3 differs from the embodiment of FIG. 1 on the one hand as a result of the arrangement of the table fan 10 with respect to the cooking hob 11. As can be seen in FIG. 3, the table fan 10 is arranged behind or next to the cooking hob 11, of which only one cooking zone 110 is shown in FIG. 3.

Furthermore, the second embodiment shown as a schematic diagram according to FIG. 3 differs from the first embodiment in that the ventilation device 3 has a different structure. The ventilation device 3 of the second embodiment comprises a multi-part filter chamber 30. In particular, the filter chamber 30, which can also be referred to as a housing, comprises a fixed lower housing part 300 and a movable upper housing part 301.

Figure 5:
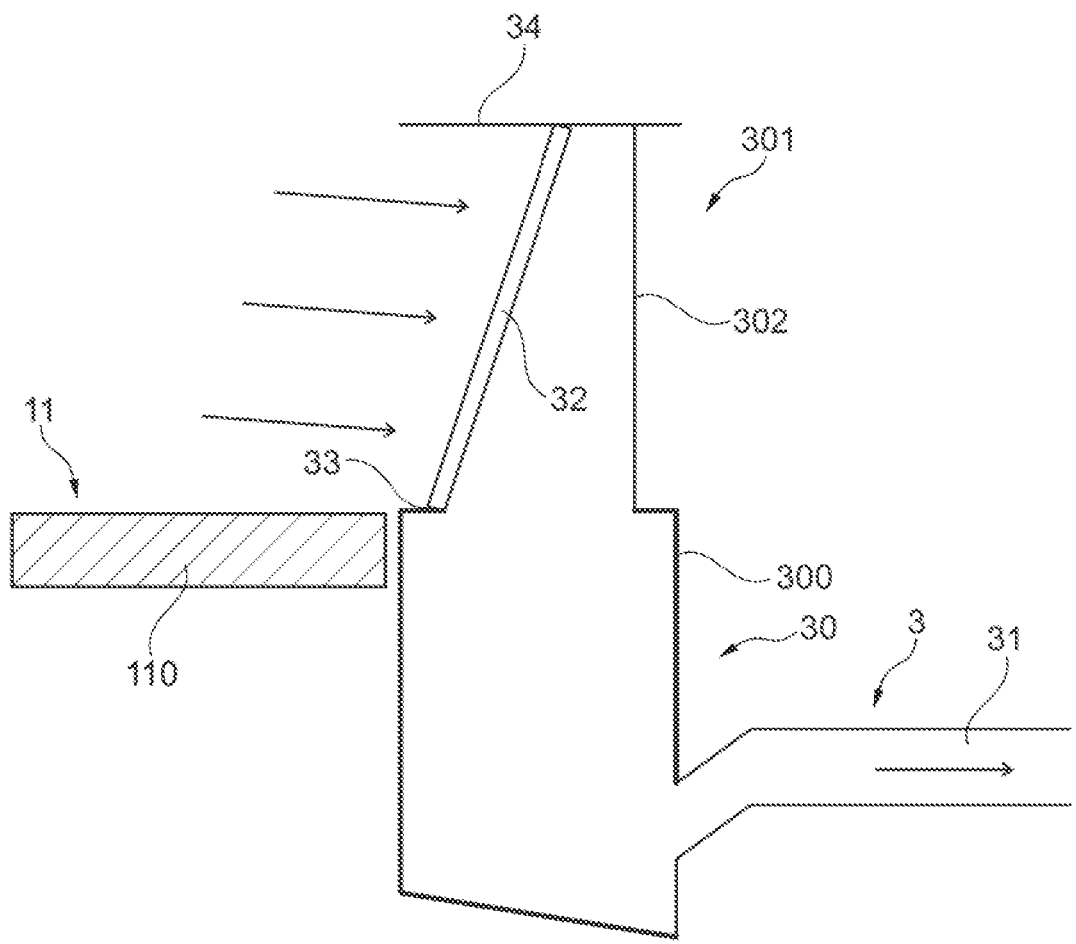
FIG. 5: A diagrammatic view of the method of operation of the ventilation device of the second embodiment of the table fan.

The ventilation device 3 and its function are described in more detail with reference to FIG. 5, in which the table fan 10 is shown without the cleaning device 2 for greater clarity. In FIG. 5 the upper housing part 301 is shown in the upwardly extended position relative to the lower housing part 30, which can also be referred to as the operating position of the table fan 10. The lower housing part 300 corresponds to the filter chamber 30 of the first embodiment. The upper housing part 301 comprises the cover 34 which forms the upper side of the upper housing part 34. Moreover, the upper housing part 301 has a rear wall 302 which extends downwards from the cover 34. The filter element 32 is fastened to the upper housing part 301. In particular, in the embodiment shown, the filter element 32 is oriented such that it is accommodated at an incline from the vertical in the upper housing part 301. However, it is also within the scope of the invention that the filter element 32 is retained vertically in the upper housing part 301. The upper housing part 301 is open at the bottom. The suction opening 33 of the ventilation device 3 is located on the side of the housing part 301 which is opposite the rear wall 302 and on which the filter element 32 is arranged. The approaching vapors are indicated diagrammatically by means of arrows in FIG. 5.

The lower housing part 300 of the filter chamber 30 is open at the top. The upper housing part 301 is introduced into the lower housing part 300 through the opening of the lower housing part 300. In the lower housing part 300, the suction pipe 31 is connected in a wall; in contrast to the first embodiment of the ventilation device according to FIG. 1, the suction pipe 31 is designed to rise upwards from the filter chamber 30. However, it is also in the scope of the invention that the suction pipe 31 runs horizontally. In accordance with the first embodiment, the bottom of the lower housing part 300 is inclined.

As can be seen from FIG. 3, in this embodiment too the lower area of the filter chamber 30 and in particular of the lower housing part 300 forms the reservoir 22 of the cleaning device 2. The design of the cleaning device 2 corresponds to the first embodiment, which is shown in FIG. 1, and is therefore not described again.

After using the ventilation device 3 of the table fan 10, the upper housing part 301 can be retracted into the lower housing part 300, as shown in FIG. 3. In this position, which can also be referred to as the idle position or cleaning position, the cover 34 closes the opening of the lower housing part 301 upwards. The rear wall 302 of the upper housing part 301 projects so far into the lower housing part 301 that it covers the suction pipe 31 at the front. The rear wall 302 is at a distance from the wall of the lower housing part 300 in which the supply connection and the inlet of the suction pipe 31 are located. In the cleaning position, cleaning liquid R, for example, water, can be introduced via the supply pipe 250 into the lower housing part 300 of the filter chamber 30. Due to the distance from the rear wall 302, the cleaning liquid can reach the bottom of the filter chamber 30, which serves as a reservoir 22. As can be seen from FIG. 3, preferably cleaning agent R is introduced into the reservoir 22 until the lower edge of the upper housing part 301, in particular the lower edge of the rear wall 302, projects into the cleaning agent. Then the cleaning of the table fan 10 can be performed, as described above. The different cleaning programs described above can also be carried out with the second embodiment of the table fan 10.

Figure 4:
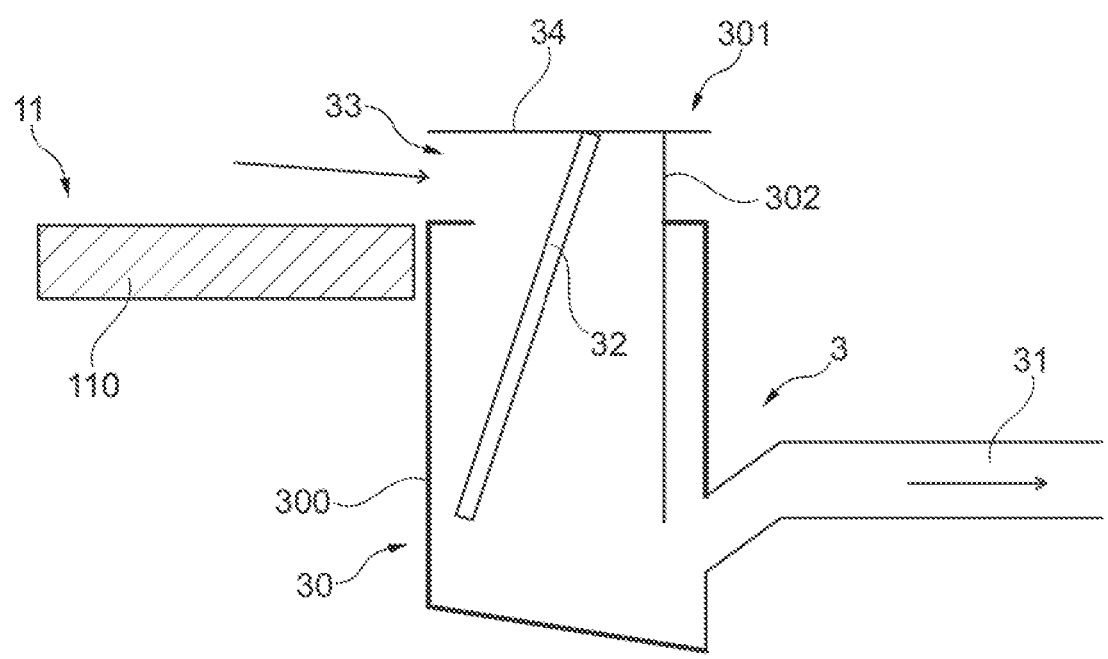
FIG. 4: A diagrammatic view of the second embodiment of the table fan according to the invention in a drying step.

For drying of the filter element 32, after the cleaning liquid R has been discharged, the upper housing part 301 can be extended so far upwards that the inlet of the exhaust air pipe 31 is no longer blocked by the rear wall 302. In this position, which is shown in FIG. 4, the fan (not shown) can be operated and the filter element 32 dried by the airflow.

The present invention is not restricted to the embodiments shown. In particular, it should be noted that the figures are schematic diagrams. The dimensions, shapes and relative arrangements of the parts of the circulation systems may therefore differ from those shown. Thus, for example, the supply pipe can be located at a point of the filter chamber that is beneath the exhaust pipe. The supply pipe can also be located on a different wall of the filter chamber from the exhaust pipe. The connecting line can also be connected to a different wall of the filter chamber, for example, on the bottom of the filter chamber.

In the case of the table fan according to the invention, the suction area and/or the suction pipe are preferably designed such that they can be closed or located such that they cannot be reached by the cleaning liquid.

In the housing, different cleaning methods can be used. For example:
  Steam for softening the impurities
  Spraying water through nozzle(s)
  Spraying hot water through nozzle(s)
  Hot water with a cleaning agent (in particular a chemical cleaning agent) and spraying through nozzle(s)

A plurality of cleaning programs can be set or selected. For example:
  Fast cleaning using only hot water
  Steam in order to facilitate manual cleaning
  Normal/intensive cleaning with a chemical cleaning agent
  Drying, for example through slight opening of the housing and if necessary additional operation of the ventilation device
  Descaling The circulation system preferably comprises the following components by means of which the cleaning liquid is routed in a cleaning circuit:
  Filter element of the ventilation device
  Pump
  Heating
  Nozzle The table fan, which can also be referred to as a device, is, for example, connected to a water pipe, in particular a freshwater pipe. Water pipes are generally found in kitchens beneath the worktop. The device is preferably connected to an outlet, in particular to a wastewater pipe. The device is designed in such a manner that no water remains therein. Alternatively, a tank can also be used in which the cleaning liquid used is collected and disposed of at intervals after discharge from the cleaning circuit.

The user of the table fan no longer needs to clean the same by hand. Pipes for fresh water and wastewater are usually provided in kitchens so that the table fan can be easily connected. Cleaning agents can be used which, for example, are also used for a dishwasher, for example solid cleaning agents in the form of tabs. As at least the filter elements can be easily cleaned, they always perform optimally as saturation of the filter elements can be prevented.

The invention claimed is:

1. A table fan comprising:
  a fan generating a flow of air;
  a cleaning device including a circulation system for guiding cleaning liquid in a cleaning circuit;
  a filter chamber having a suction opening via which air is suctioned downwards; and
  a filter element arranged in the filter chamber and having at least one portion which is located in the cleaning circuit,
  wherein the filter chamber includes two housing parts, one of the two housing parts having at least one area which is extendable, said suction opening being formed in the one of the two housing parts.

2. The table fan of claim 1, wherein the circulation system of the cleaning device comprises:
  a reservoir for the cleaning liquid,
  a nozzle directed at least temporarily at the filter element,
  a pump for pumping the cleaning liquid to the nozzle, and
  a connecting line between the reservoir and the nozzle for supplying cleaning liquid to the nozzle.

3. The table fan of claim 2, wherein the reservoir is configured to include at least one area beneath the filter element for receiving cleaning liquid from the filter element.

4. The table fan of claim 1, wherein the cleaning device includes a heating element for temporary heating of the cleaning liquid.

5. The table fan of claim 1, wherein the cleaning device includes a supply connection for supplying cleaning liquid to the cleaning circuit and an outlet connection for draining cleaning liquid from the cleaning circuit.

6. The table fan of claim 2, wherein a lower area of the filter chamber includes the reservoir.

7. The table fan of claim 6, wherein the reservoir is a separate container disposed beneath the filter chamber.

8. The table fan of claim 1, further comprising a control unit configured to activate the cleaning device to automatically clean the filter element.

9. A method for cleaning the table fan of claim 1, said method comprising:
  (a) closing the filter chamber during the cleaning cycle with a cover;
  (b) closing the filter chamber in respect of the suction pipe during a cleaning cycle with a damper and the extendable housing part;
  c) pumping the cleaning liquid to a nozzle of the circulation system of the cleaning device of the table fan;
  d) spraying the cleaning liquid by the nozzle onto the filter element in the filter chamber of the table fan;
  e) collecting the cleaning liquid by the filter element; and
  f) continuing to pump the cleaning liquid to the nozzle.

10. The method of claim 9, further comprising:
  removing the cleaning liquid from the cleaning circuit of the circulation system after going through steps a)-d) at least once;
  supplying further the cleaning liquid in the cleaning circuit; and
  repeating steps c)-f) at least once more.

11. The method of claim 9, further comprising adding a cleaning agent to the cleaning circuit.

12. The method of claim 9, further comprising adding a multi-component cleaning agent to a reservoir of the circulation system.

13. The method of claim 9, further comprising heating the cleaning liquid.

14. The method of claim 9, further comprising drying the circulation system.

15. The method of claim 9, further comprising storing at least one program in a control unit to automatically execute steps c)-f).

16. The method of claim 9, further comprising heating the cleaning liquid to evaporate the cleaning liquid.

17. The method of claim 14, wherein the drying the circulation system includes drying at least the filter element.

18. The table fan of claim 9, wherein the cover seals the filter chamber during the cleaning cycle, and
   wherein a heating element is configured to evaporate the cleaning liquid.

19. The method of claim 9, further comprising:
   a drying cycle for drying the circulation system, and
   a ventilation cycle,
      wherein the damper is configured to open the filter chamber in respect of the suction pipe during the drying cycle; and
      wherein the extendable housing part is configured to be extended upwards such that a lower end does not extend into the cleaning liquid and the filter chamber is open in respect of the suction pipe.

* * * * *